US010212547B1

(12) United States Patent
Santiago

(10) Patent No.: US 10,212,547 B1
(45) Date of Patent: Feb. 19, 2019

(54) QSL CARD MOBILE CONFIRMATION SYSTEM AND METHOD OF USING THE SAME

(71) Applicant: Carlos L. Santiago, Caguas, PR (US)

(72) Inventor: Carlos L. Santiago, Caguas, PR (US)

(*) Notice: Subject to any disclaimer, the term of this patent is extended or adjusted under 35 U.S.C. 154(b) by 0 days.

(21) Appl. No.: 15/668,656

(22) Filed: Aug. 3, 2017

Related U.S. Application Data

(60) Provisional application No. 62/370,668, filed on Aug. 3, 2016.

(51) Int. Cl.
| | |
|---|---|
| *H04W 4/02* | (2018.01) |
| *H04L 29/06* | (2006.01) |
| *H04W 4/029* | (2018.01) |
| *H04W 12/06* | (2009.01) |
| *H04L 29/08* | (2006.01) |

(52) U.S. Cl.
CPC ......... *H04W 4/023* (2013.01); *H04L 63/0876* (2013.01); *H04L 63/107* (2013.01); *H04L 67/18* (2013.01); *H04W 4/029* (2018.02); *H04W 12/06* (2013.01)

(58) Field of Classification Search
CPC ............... H04B 13/02; G06K 15/4095; G06F 17/30241; G06F 17/30312
USPC .......................................... 455/456.1–456.6
See application file for complete search history.

(56) References Cited

U.S. PATENT DOCUMENTS

| 9,152,900 B1* | 10/2015 | Santiago | ............ G06K 15/4095 |
| 2004/0073555 A1* | 4/2004 | Hevener | .................. H04B 1/06 |
| 2005/0125497 A1* | 6/2005 | Hevener | ................ G06Q 10/10 |
| | | | 709/205 |

* cited by examiner

*Primary Examiner* — Joshua L Schwartz
(74) *Attorney, Agent, or Firm* — Hoglund & Pamias, PSC; Roberto J. Rios

(57) ABSTRACT

The invention provides a mobile QSL confirmation method that allows users to receive and confirm their incoming QSLs using a mobile device. This is achieved by gathering certain information from the mobile device, like GPS coordinates and/or carrier network information, in order to authenticate the user exact position. Once the account credentials and global position are verified, the system will provide the received QSL ID code in order to confirm.

15 Claims, 16 Drawing Sheets

FIGURE 8

QSL CARD MOBILE CONFIRMATION SYSTEM AND METHOD OF USING THE SAME

BACKGROUND OF THE INVENTION

There are two existing methods for a radio contact confirmation between two amateur radio stations (the term use is "QSL"—Can you acknowledge receipt?), the QSL card exchange traditionally by mail or QSL bureau (a group voluntary Amateur Radio Operators around the world, QSL Managers) and the electronic logbook match up in a database system. For example, Logbook of The World (LoTW), the American Radio Relay League (ARRL) online system, make this electronic matching and confirm the contact. However, a QSL post card is not sent. Traditionally the QSL post card by mail service or QSL Bureau was the method of confirmation of a radio contact (QSO) between amateur stations. Sometimes, it takes years to receive a QSL card by mail or Bureau and in many occasions the stations have to send money to the other station to pay for the mailing process.

The QSL card is a very desirable item by most of the amateur radio operators around the world because it is a solid evidence of their achievements and thus, it has become an integral part of the hobby tradition. The QSL card is a piece of evidence that lasts for a lifetime, a piece of other country, other culture and a collectible item.

Alternatively, with the use of the electronic log match came the digital QSL postcard exchange (like eQSL.cc does online), wherein the users have the ability to send and receive a digital QSL card when a log match takes place. This digital QSL card can be downloaded and managed in a local computer of the users. However, this generates a problem of fraud and fake confirmations due to the advancement in digital manipulation now a day. For that reason, the ARRL and many other Radio Organizations does not recognize the eQSL system cards to be a valid confirmation method to obtain any award granted by these organizations. If the user wants to submit this cards for award purposes, the granting organizations have to print the cards and send it back to the sending station for signing and then submit it for awards.

Also, is a very common for simulating a QSO confirmation practice to obtain the accounts security username, passwords and certificates software. Thus, many stations around the world are hesitant to use any of these two systems because of the security issues, the lack of quality, complexity and poor offering in terms of choices.

Thus, what is needed is a simple yet secure QSL confirmation system that allows the exchange of confirmed and valid QSL cards between two users that allows printing and/or exchanging QSL cards while at the same time providing a fraud-free submission and certification system.

BRIEF DESCRIPTION OF THE DRAWINGS

Further features and advantages of the invention will become apparent from the following detailed description taken in conjunction with the accompanying figures showing illustrative embodiments of the invention, in which:

FIG. 8 illustrates the Activity Section according to the present invention.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

In accordance with the QSL confirmation system of the present invention, a first radio station and a second radio station have been previously registered with the eBabel system and have valid accounts. Therefore, their respective electronic logbooks detailing all their contacts and communications were uploaded to the System in ADIF (Amateur Data Interchange Format). The system performs a matching operation via a Matching Mechanism Module where Log records in the database are automatically compared looking for matching entries between two stations. The matching criteria by both participating stations to be searched and compared by the system are at least: 1) Stations call signs, 2) band (radio frequency), 3) operating mode, and 4) Date and Time (UTC) of the contact with a maximum of 30 minutes of difference between records. The matching process is transparent to both radio stations concerning a QSO so that no log entry or confirmation status can be seen before the match takes place. Once the match is positive the QSL cards are generated automatically by the system and transferred and migrated to the Manager section of each user within the system. One important feature of the invention is that now the user has more than one option to confirm the QSL communication, namely: 1) the user can extract the QSL card via the Internet directly to a network-connected printer, personal or commercial printer in order to obtain a confirmation code to be used for further confirmation into the system (as explained in co-owned U.S. Pat. No. 9,152, 900 incorporated herein by reference in its entirety) or 2) the user can synchronize a mobile application or software running on a portable or mobile apparatus to the eBabel system in order to authenticate the location of the user and once a user location is confirmed the eBabel system provides the confirmation code to said mobile application or software to be used for further confirmation into the system.

Figure 1:
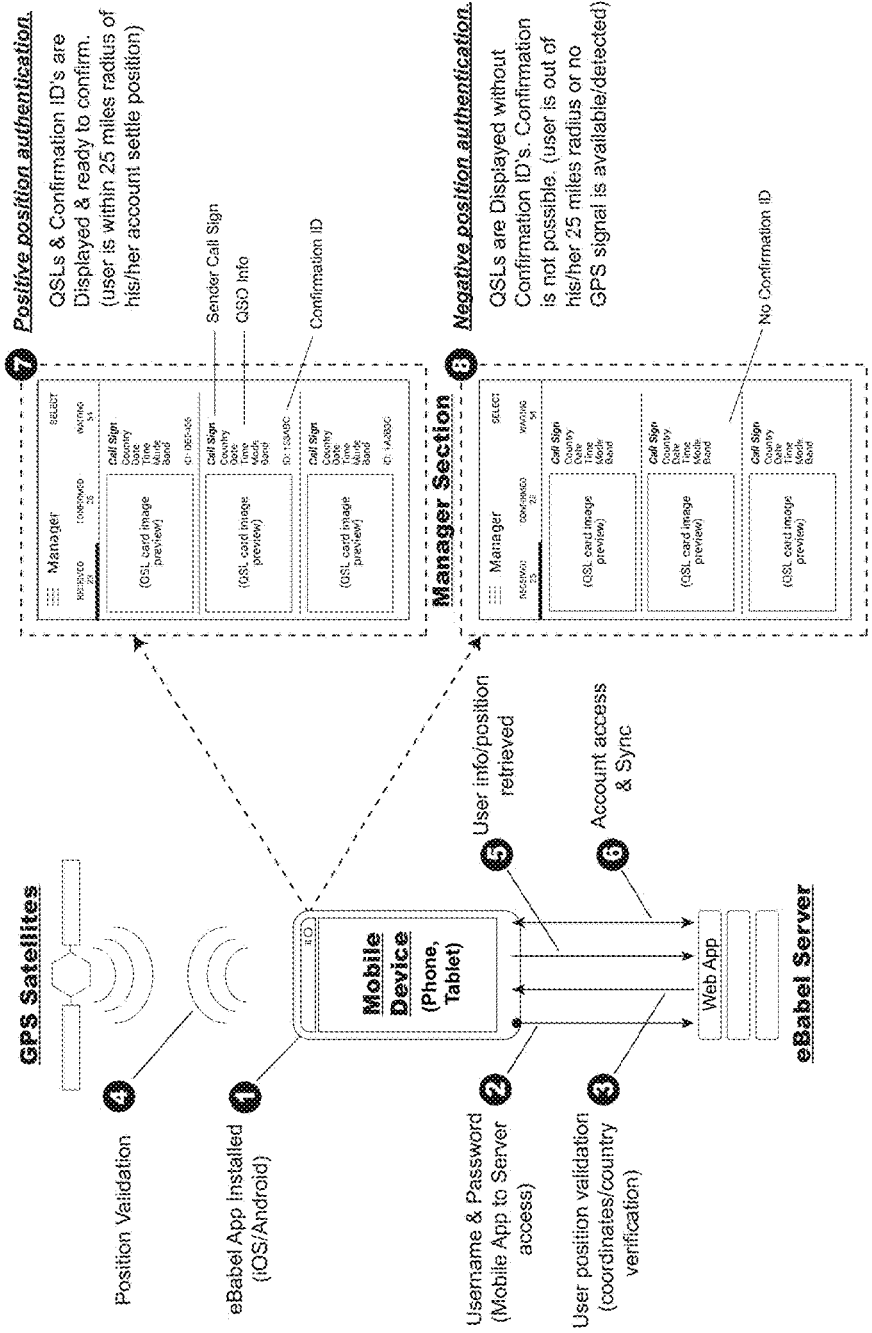
FIG. 1 illustrates the general operation of the mobile confirmation option according to the present invention.

The general operation of the mobile confirmation option will be now described in conjunction with FIG. 1. A radio station must be a registered eBabel System user and have already installed the eBabel Mobile Application (app) on their mobile device such as: a phone, a tablet or any other portable apparatus capable of running software, access a network such as the Internet and have location/position determining capabilities such as a GPS module. The user logs into the eBabel system by entering the credentials of his/her actual eBabel account such as: the username and password into the mobile app. The mobile app and the eBabel system server are then synchronized over the network via Internet. Once the mobile app and the eBabel system server are synchronized, the eBabel system server initiates the process for authenticating the Country/Coordinates of the user based on the information provided on the user's account settings. For this purpose, the mobile app activates the GPS module of the mobile device in order to acquire the user's current coordinates/position, which are further transmitted to the eBabel system server for authentication. The user's current coordinates/position is compared by the eBabel system server against the user's previously registered location to authenticate the user if the user's current coordinates/position matches the user's previously registered location. For the purpose of the invention, a match is determined when the user's current coordinates/position is within a predetermine distance of the user's previously registered location. In a preferred embodiment of the invention, a match is determined when the user is located within a twenty-five (25) miles radius from the user's previously registered location. After a location match is determined the eBabel system server proceeds to generate and transmit to the mobile app a unique confirmation code associated to a QSL communication. No codes are generated when no coordinates/position match is determined. As can be appreciated from FIG. 1, the mobile app then displays the QSL communications for further actions. If a coordinates/position match was determined, a Positive Authentication occurs and the QSL's are displayed at the mobile device including the unique ID code necessary to further confirm. However, when a coordinates/position match was not possible to be determined, a Negative Authentication occurs and the QSL's are displayed at the mobile device without the unique ID code necessary to further confirm.

Figure 2:
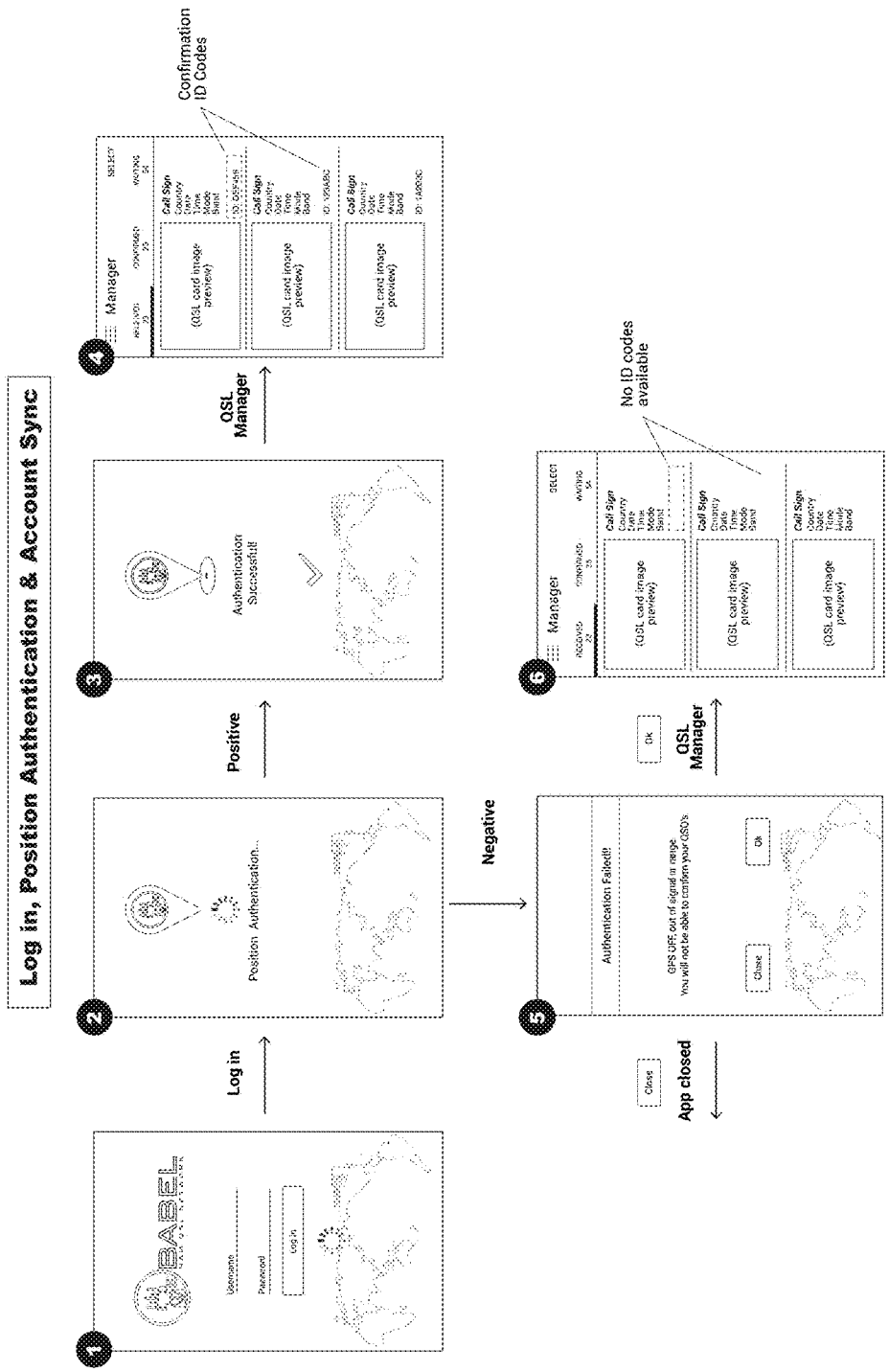
FIG. 2 illustrates the login and authentication procedure according to the present invention.

FIG. 2 illustrates the login and authentication procedure as displayed to the user by the mobile app. A login window is provided where the user must enter the same credentials, username and password, previously registered at the eBabel system account in order to access and synchronize the mobile app to the eBabel system server. The eBabel server initiates the authentication process by comparing the user's current coordinates/position with the user's previously registered location at the account settings. To that effect, the mobile app activates the GPS module at the mobile device in order to acquire and transmit the user's current coordinates/position to the eBabel system server. When a Positive Authentication occurs as previously explained, account access is granted and the mobile app displays a QSL Manager section containing all the QSL's associated with the user including the unique ID code necessary to confirm the QSL communications. However, when a Negative Authentication occurs (i.e., the user is out of the predetermined distance or GPS information/data is unavailable), the user is presented with the option of either logging out from the mobile app or to access the account without the confirmation codes where the QSL Manager section is presented with the QSL's being displayed at the mobile device without the unique ID code necessary to confirm the QSL communications. Accordingly, the user is unable to confirm the QSOs/QSLs until the user's location is determined to be within the predetermined distance and/or the mobile device provides GPS information/data.

Figure 3:
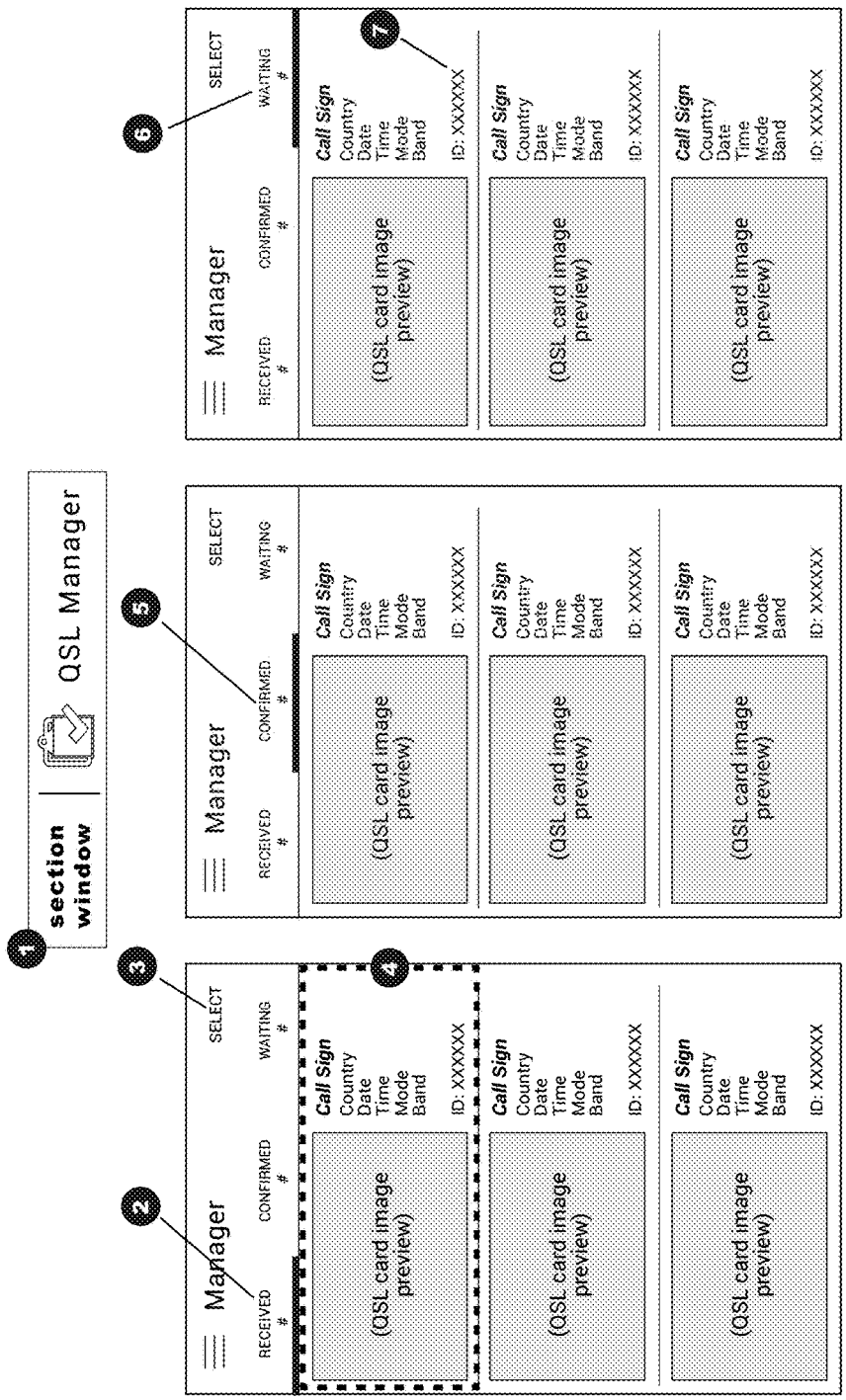
FIG. 3 illustrates the QSL Manager Section according to the present invention.

The user is presented with several options at the QSL Manager section to selectively manage all the QSL's available as illustrated in FIG. 3. At the QSL Manager section, the user receives, manages and confirms the incoming QSL's. In this regards, this section corresponds to the "Manager" section explained in co-owned U.S. Pat. No. 9,152,900, incorporated herein by reference in its entirety. However, all the printing related steps (i.e., card printing and ID retrieval) are omitted, as they are not necessary in the mobile confirmation option. As can be seen, a Received tab is provided where the newly received QSL cards are displayed. A Confirmed tab displays the QSL cards where both users/stations have completed the confirmation steps necessary and no further actions are required. A Waiting tab displays QSL cards that have not been confirmed, where confirmation from the other user/station is expected to complete the confirmation process. A Select option is provided that after tapped, the user could mark/choose a desired QSL. Once tapped, the "Option" word appears instead of "Select", wherein the "Options" menu choices are available in order to execute the action needed over the card(s) selected. As can be seen, a card thumbnail is visible beside the QSO information and the confirmation ID (if positive authentication is achieved). As previously explained, a Confirmation Unique ID is available only after positive authentication. Otherwise, the confirmation codes will neither be available nor displayed preventing completion of the confirmation process.

Figure 4:
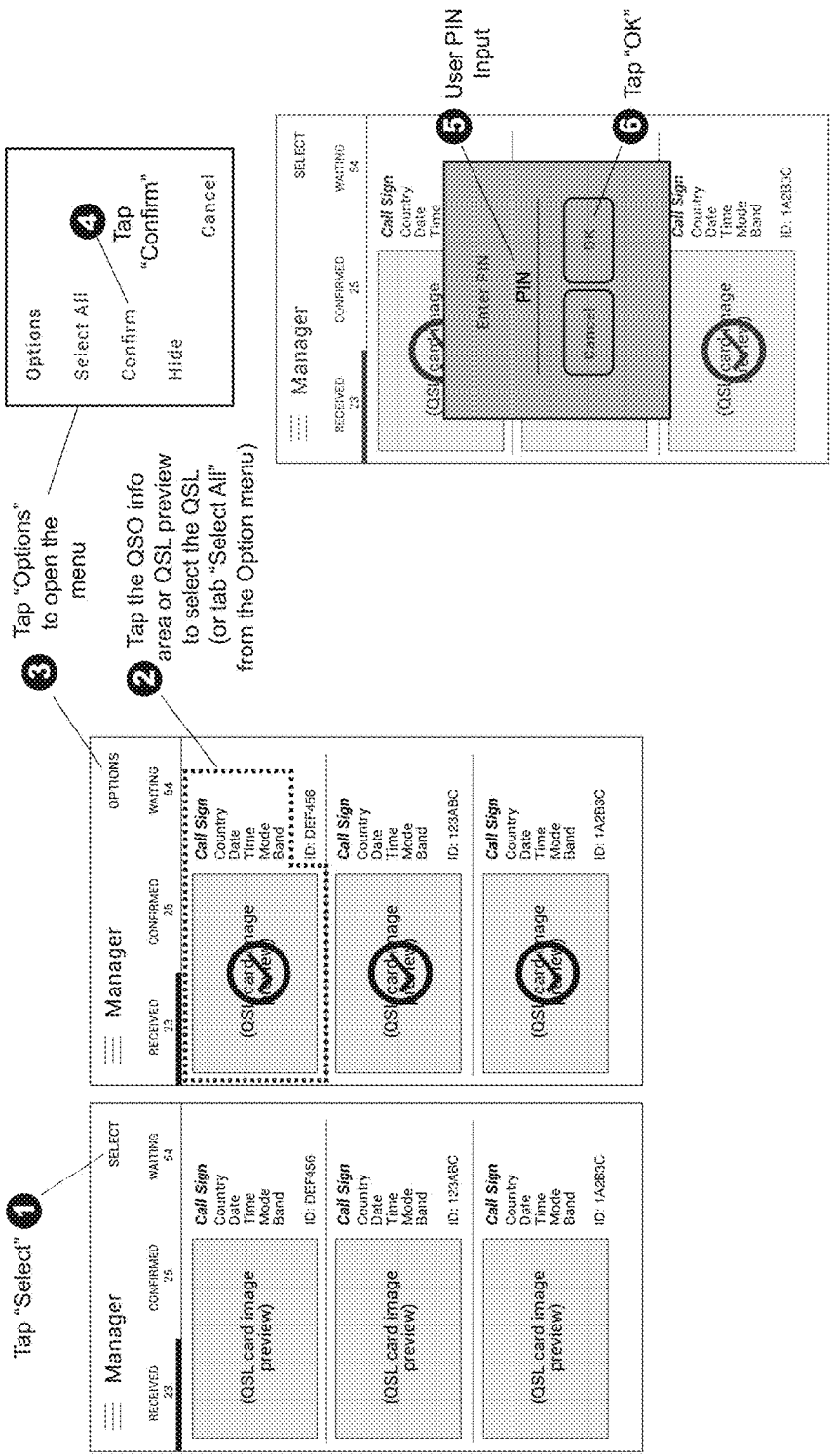
FIG. 4 illustrates the mobile confirmation procedure according to the present invention.

FIG. 4 illustrates in more detail the confirmation procedure at the mobile app. A user selects a desired QSL card by tapping the "Select" option and proceeds to choose the desired QSL, wherein a check mark appears over the QSL preview when selected. At that time, the word "Options" appears instead of "Select" and the "Options" menu is available in order to execute the action needed over the card(s) selected. In order to confirm a QSL communication, the user taps the "Options" word and from the menu selects the "Confirm" option. Afterwards, the system will ask for the users' previously assigned/selected four digits encrypted personal identification number (PIN) in order to finish the confirmation process as shown in the Figure.

Figure 5:
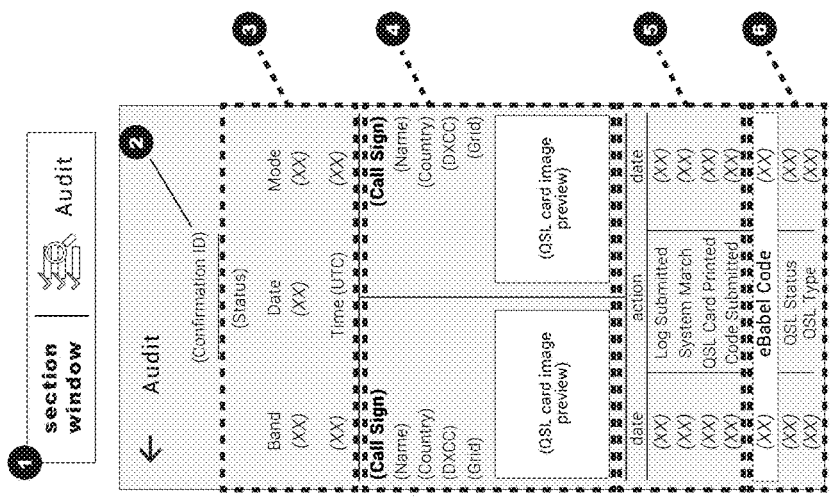
FIG. 5 illustrates the Audit Trail Tool Section according to the present invention.

The mobile app also provides an Audit Trail Tool to verify the QSO-QSL exchange status and stages between two users/stations as illustrated in FIG. 5. With this toll any user/station could verify the authenticity of any QSO-QSL transaction by entering a QSL unique confirmation ID code. When a user enters the unique confirmation ID code, the system will display all details, steps/actions completed by both stations concerning the QSO and QSL exchange associated to QSL communication of the unique confirmation ID code. A QSO details section displays the Mode, Band, Date and Time (Could be different for both stations. No more than 30 minutes apart) as well as the overall process status (i.e., Pending or Confirmed). A Stations Info section displays the call signs, names, countries, DXCC's, grids and the QSL cards preview exchanged in the transaction by both users/stations. A Steps Time-Stamp section displays the Date and Time of the following: ADI log submission, system records match, when the card was printed (if applicable) and when the user enters the QSL confirmation code to the system. A QSL Info section displays the QSL unique confirmation ID code of both QSL cards (only when entered/retrieved by the user), the QSL status (Received, Printed, Waiting or Confirmed) and the QSL type (Full card, Text Report, Label, Card and Mobile). Note that the "Mobile" type will be used when the confirmation process is made using the mobile app. Also, the "QSL Card Printed" field will show a dash/hyphen symbol (-).

Figure 6:
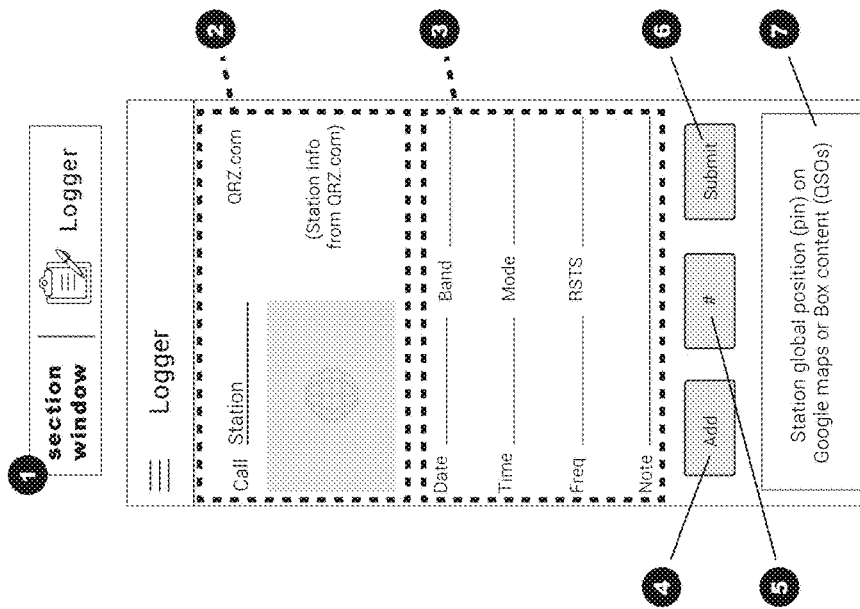
FIG. 6 illustrates the Logger Section according to the present invention.

A Logger Section is provided for the user to log contacts and submit them in ADI format as illustrated in FIG. 6. This section corresponds to the "Logger" section explained in co-owned U.S. Pat. No. 9,152,900, incorporated herein by reference in its entirety. A Call Sign Input section is provided so the user enters the Call Sign of the station to be logged. Optionally, a user might tap the enter key on the mobile device to get the qrz.com station information. A QSO Info field is provided so the user enters the QSO parameters to be log. Once the minimum information (Call, Date, Time, Mode and Band) is entered the user taps the "Add" button to register the QSO and add it to the "Box" section. A toggled Box Content View/Map Recalling button is provided to show the number of QSOs in the box (number zero (0) when empty). When tapped, the map shown below the buttons will disappear/change to show the box content, wherein the word "Map" appears in the button instead of the number of QSOs in the box. When tapped again, the map will be shown again. An area is also provided to show the Box Detail List/Google Map and pin. This area will switch from showing the logged station Google map location and the box content as previously explained. Finally, a Submit button is provided so that once the user finishes logging the contacts the QSOs are submitted in ADI format to the eBabel system server.

Figure 7:
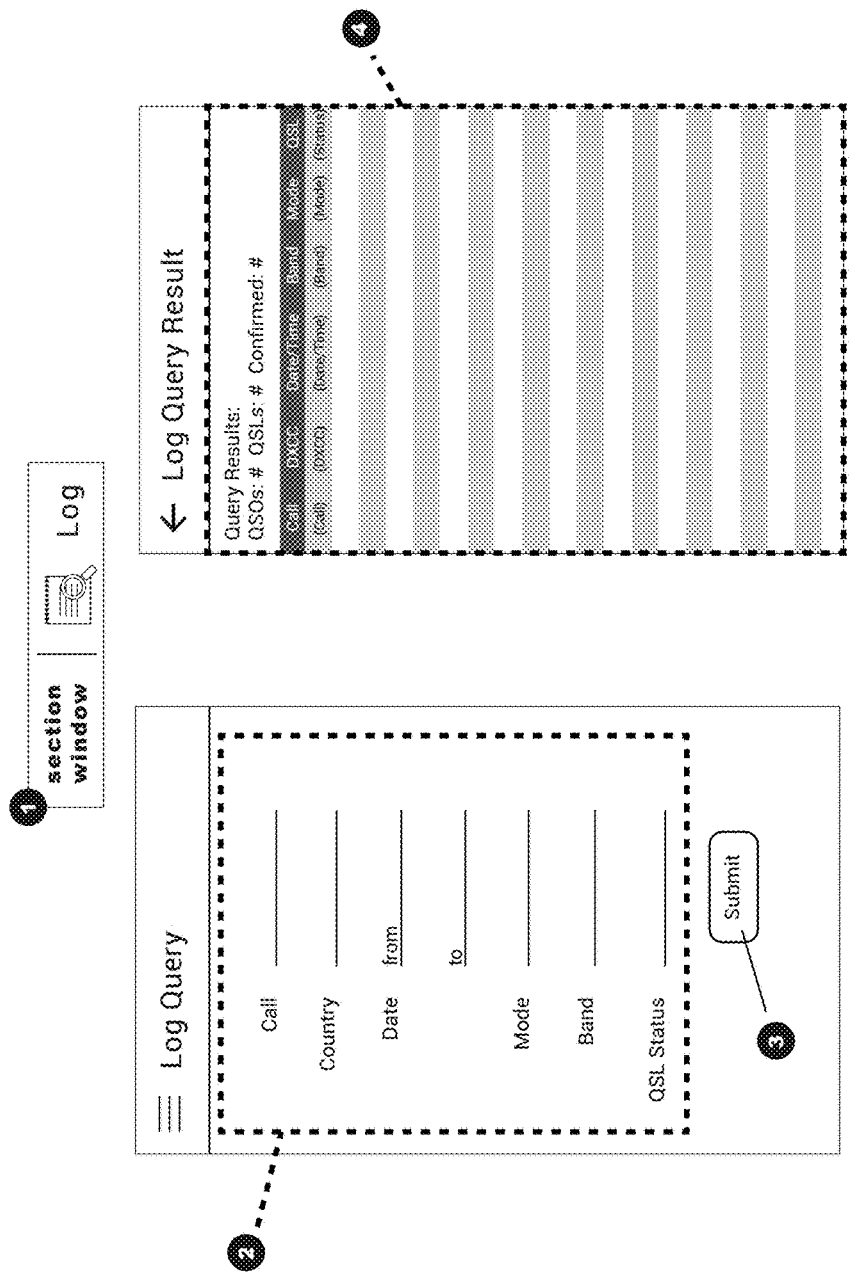
FIG. 7 illustrates the Log Section according to the present invention.
Figure 9:
FIG. 9 illustrates the Profile Section according to the present invention.

FIG. 7 illustrates a Log section where the user can obtain information related to his/her logs. In this section, the user makes a query from his/her log archives. This section corresponds to the "Log Query" tool into the "Activity" section explained in co-owned U.S. Pat. No. 9,152,900, incorporated herein by reference in its entirety. Query fields are provided along with filters/parameters so the user enters the search criteria. Once a Submit button is tapped the system generates the query results/report that will display the QSOs, QSLs and confirmed result numbers and the list of QSOs based on the search criteria previously set.

Figure 8:
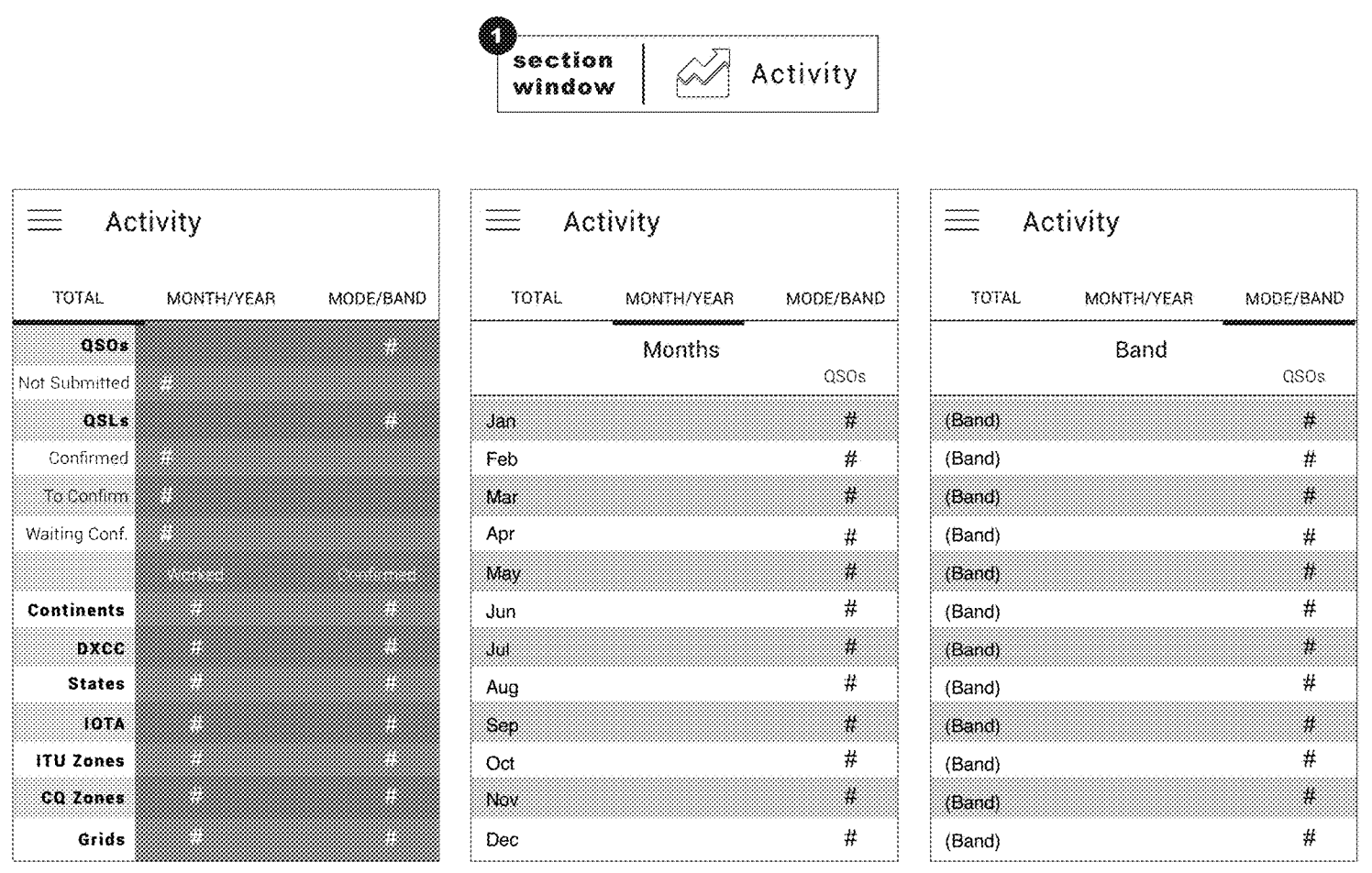

The mobile app provides an Activity Section as illustrated in FIG. 8. This section is where the users see their statistics, as it is a "read only" segment. This section corresponds to the "Activity" section explained in co-owned U.S. Pat. No. 9,152,900, incorporated herein by reference in its entirety.

The mobile app also provides a Profile section that shows the user/station information where no changes can be made, as it is a "read only" segment. This section corresponds to the "Account" section explained in co-owned U.S. Pat. No. 9,152,900, incorporated herein by reference in its entirety.

Figure 10:
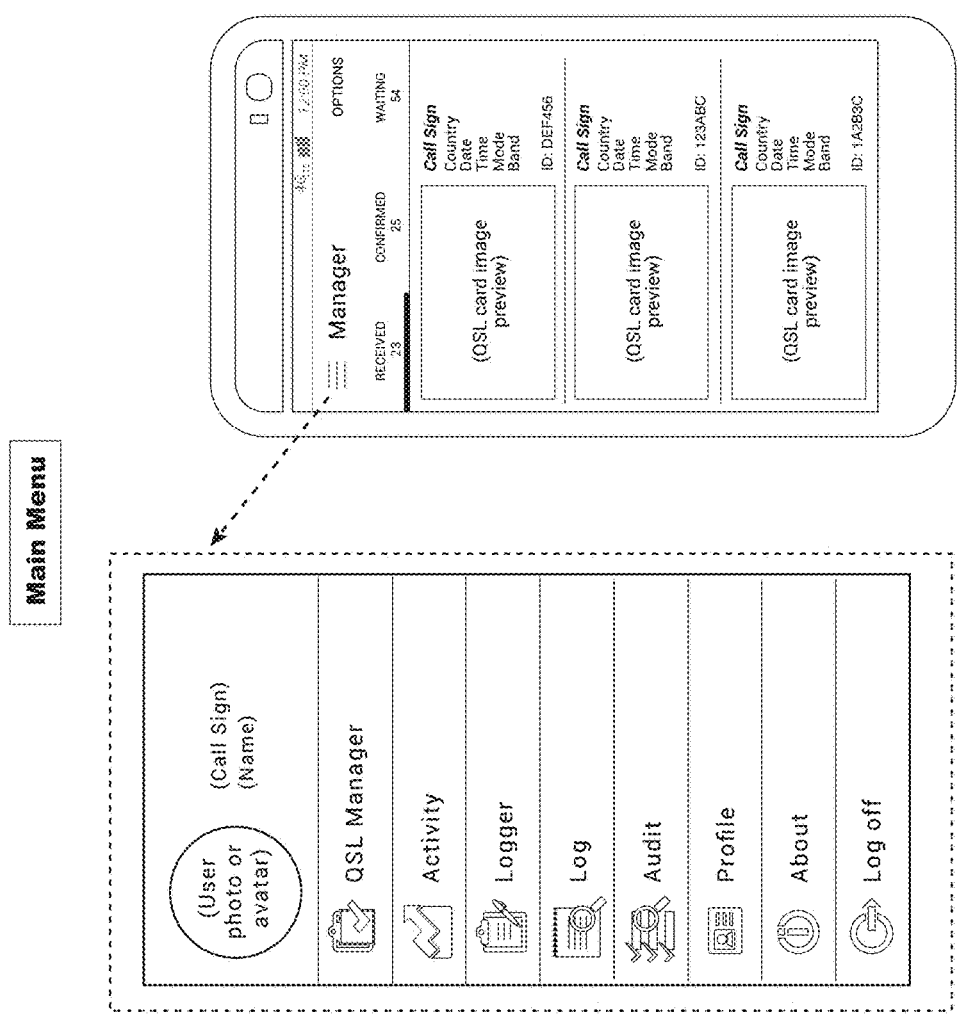
FIG. 10 illustrates the Manager Section Main Menu according to the present invention.
Figure 11:
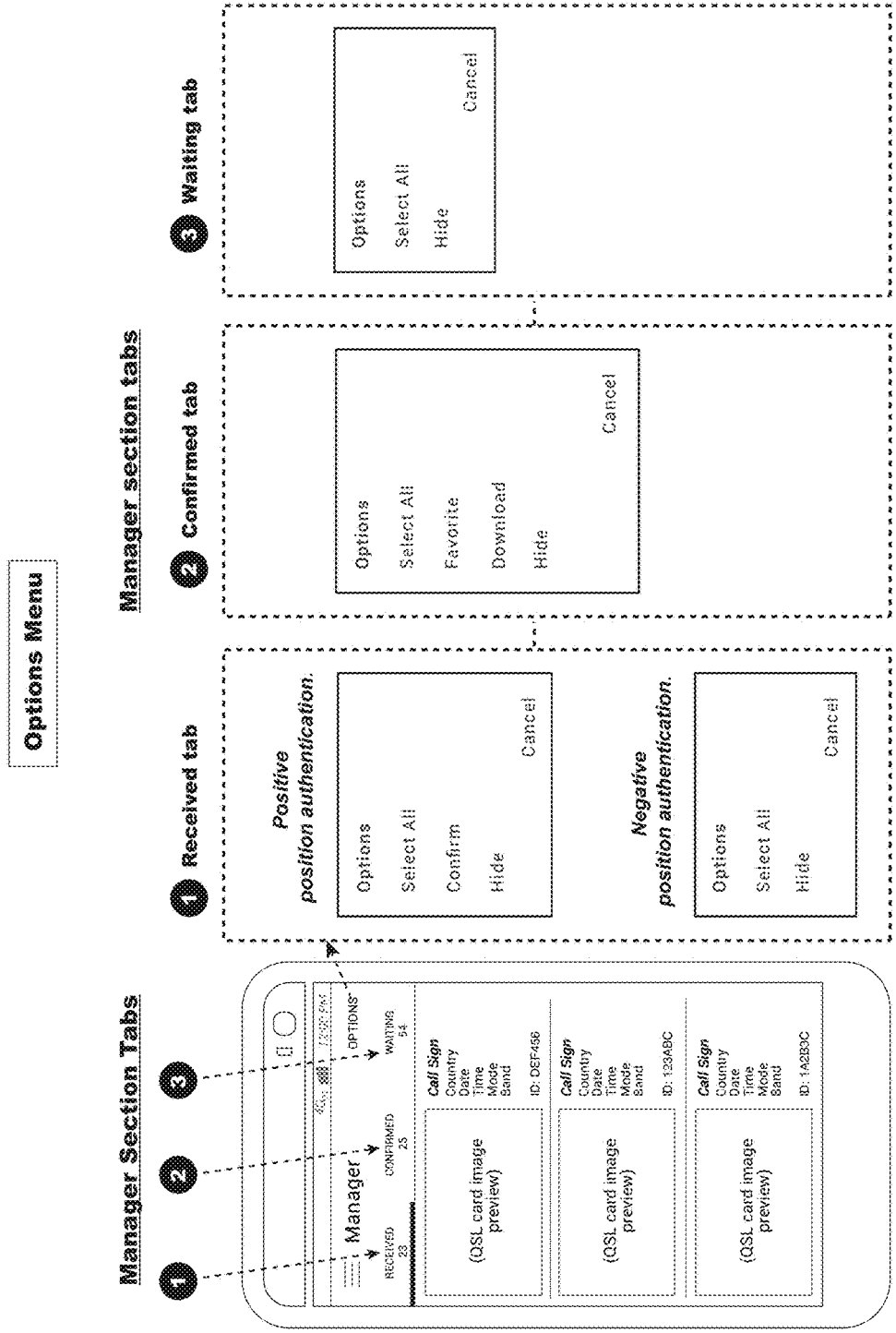
FIG. 11 illustrates the Manager Sections Options Menu according to the present invention.

The mobile app provides a Main Menu window showing personal identification information from the user such as a picture or avatar, the name of the user as well as the user's radio station call sign. As shown in FIG. 10, the Main Menu also provides a list of all the different windows and operations that can be accessed and/or controlled by the user including: QSL Manager window, Activity window, Logger window, Log window, Audit window, Profile window, an About window and a Log Off option. In the specific case where a user desires to access the QSL Manager window, the QSL Manager button is tapped and a new window is shown to the user where the QSL Manager Section is shown as illustrated in FIG. 10. As can be appreciated from FIG. 11, the QSL Manager Section provides a Received tab where all the newly received QSL cards are displayed, a Confirmed tab showing QSL cards where both users/stations have completed the confirmation steps necessary and no further actions are required and a Waiting tab showing QSL cards that have not been confirmed, where confirmation from the other user/station is expected to complete the confirmation process. An "Option" menu is also included to provide the user with different actions that will vary based on the selected tab. Accordingly, a Received Option Menu is displayed when a user selects the "Option" menu while viewing the QSL's on the Received tab, a Confirmed Option Menu is displayed when a user selects the "Option" menu while viewing the QSL's on the Confirmed tab and a Waiting Option Menu is displayed when a user selects the "Option" menu while viewing the QSL's on the Waiting tab as illustrated in FIG. 11.

Figure 12:
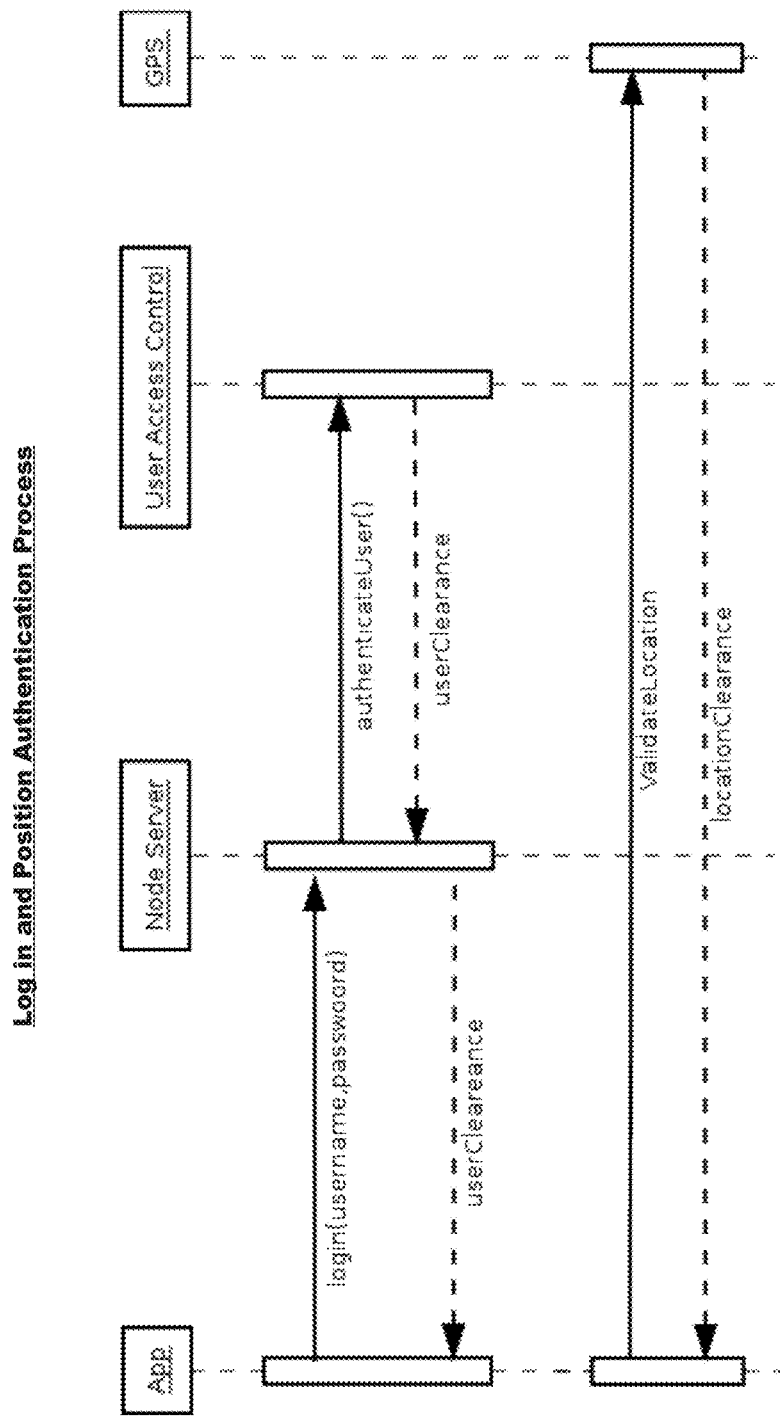
FIG. 12 illustrates the login and position authentication process according to the present invention.
Figure 13:
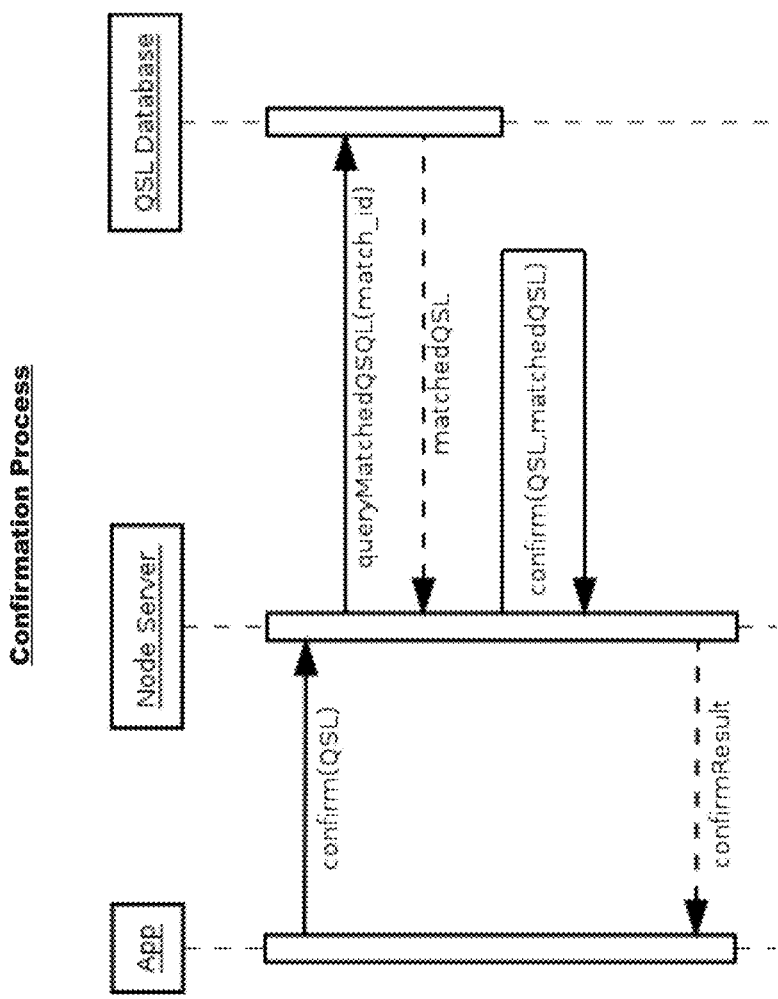
FIG. 13 illustrates the confirmation process according to the present invention.
Figure 14:
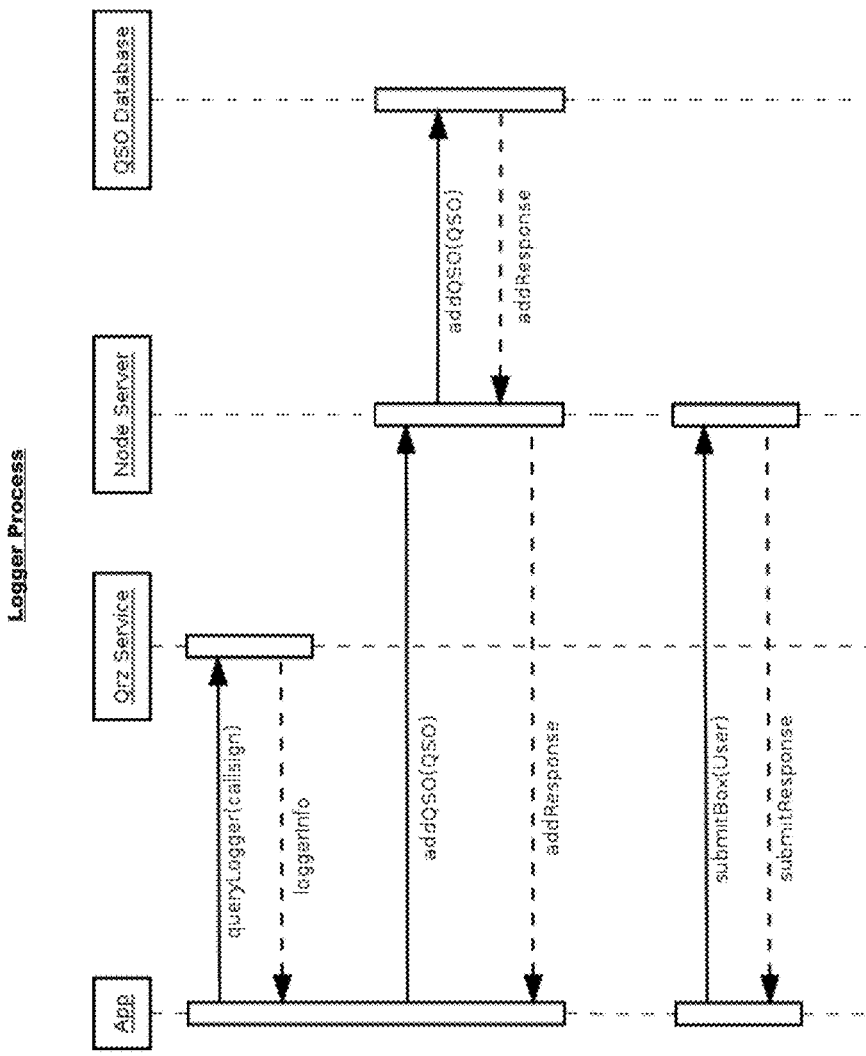
FIG. 14 illustrates the logger process according to the present invention.

FIG. 12 illustrates the login and position authentication process from a backend perspective. Specifically, the mobile app sends the user authentication data via REST/JSON over HTTPS to Node.JS Server. The server then authenticates the user and creates a JWT (JSON Web Token), wherein the GPS module validates the user current location against the predetermined distance previously established. FIG. 13 illustrates the confirmation process from a backend perspective. The mobile app sends selected QSLs to Node.JS server via REST/JSON over HTTPS, then the server queries and fetches matched QSLs and set the matching status. FIG. 14 illustrates the logger process from a backend perspective. Specifically, the mobile app queries and fetches the logger information from the Qrz service via REST/XML, and once done, the QSO is sent to the Node.JS service, where the server searches the current Logger box, and if it does not exist, a new Box is added by default; one new QSO record is added to the box. The Box is submitted by the mobile app sending the current user to Node.JS Server, the server fetches the current logger box, then it calls the Record Matching Module via REST Apache Service.

Figure 15:
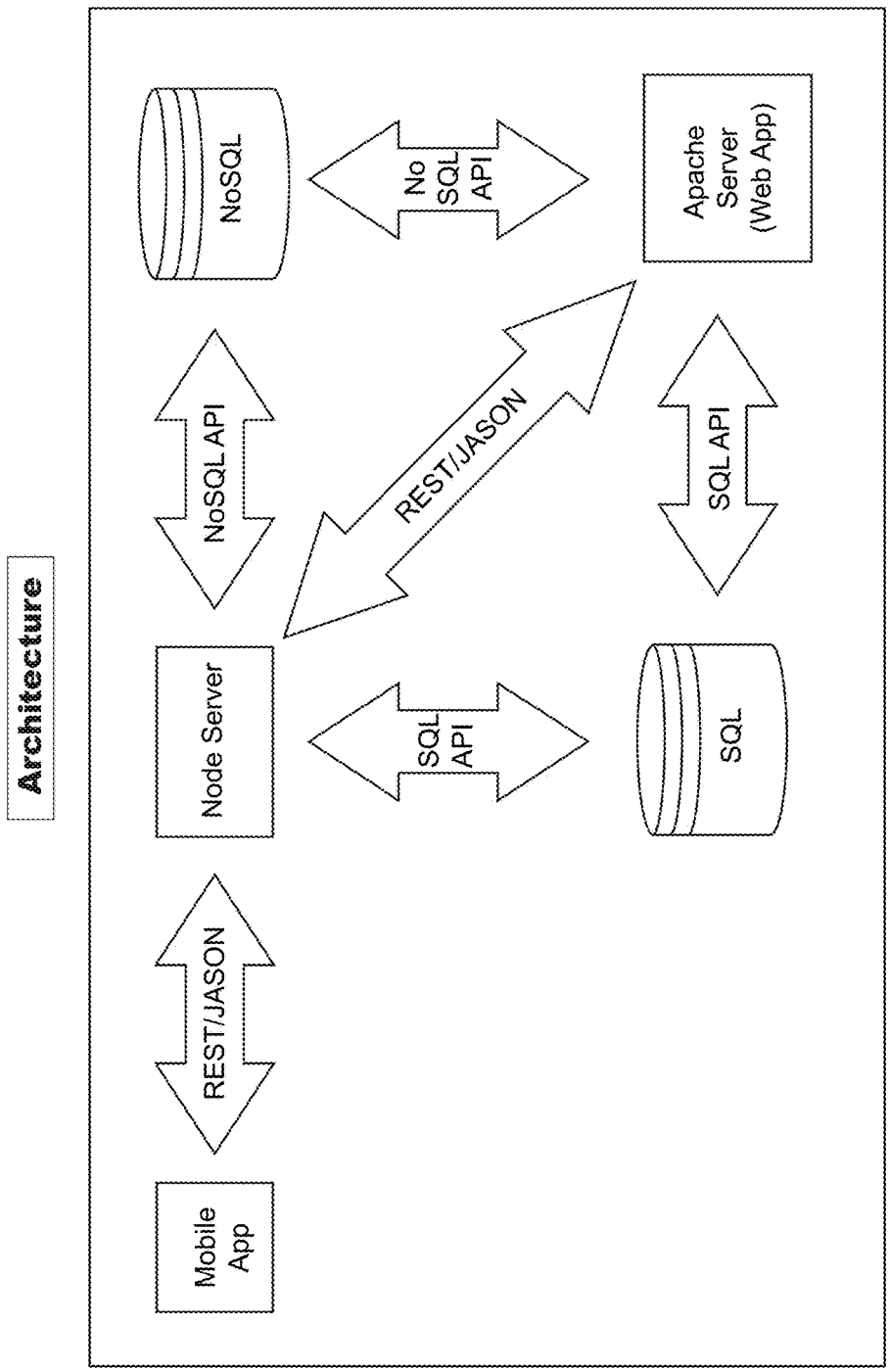
FIG. 15 illustrates the general architecture of the eBabel mobile implementation according to the present invention.

The general architecture of the eBabel mobile implementation is illustrated in FIG. 15. The eBabel implementation is built on Xamarin Forms, this enable to render native components on each device. Node.JS Server is responsible to handle all request made by the app, via REST/JSON over HTTPS, providing user information and QSO records fetched from the API. Apache Server handles public resources and some core functionalities requested by Node Server via REST/JSON.

Figure 16:
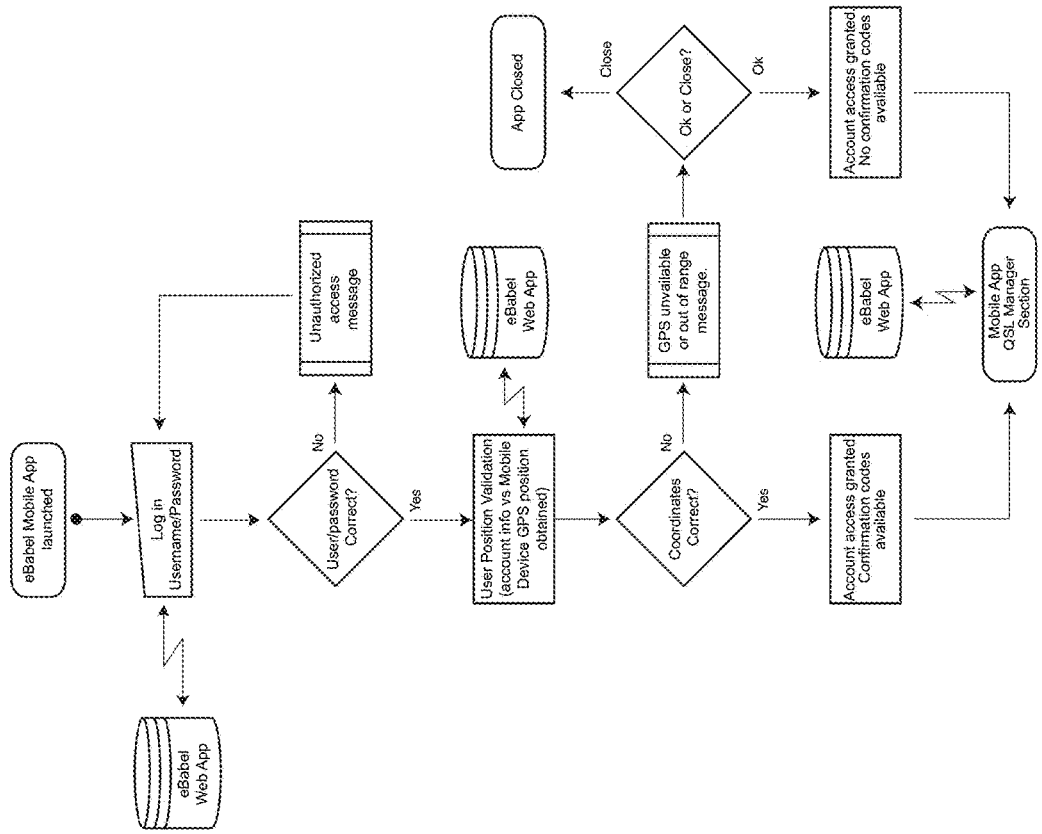
FIG. 16 shows a flowchart explaining the general process of the mobile implementation according to the present invention.

The general process of the mobile implementation will be explained in conjunction with the flowchart of FIG. 16. A confirmation process begins when a user logs into the mobile app by entering the previously registered username and password for authentication by the eBabel server. If the login credentials are incorrect the user will be taken to the login screen. If the login credentials are correct the mobile app is synchronized to the eBabel server and the user position validation process begins where the GPS location information provided by the mobile device is verified by the eBabel server against a user's location previously stored in the system. If the location is not matched the user is provided with the following options: 1) close the mobile app or 2) granting account access and directing the user to the QSL Manager section where the QSL's will be displayed without the unique ID codes preventing confirmation on any QSL. In contrast, when the location is matched by the eBabel server account access is granted and the user is directed to the QSL Manager section where the QSL's will be displayed with the unique ID code for further confirmation of the QSL communication as previously explained.

The eBabel mobile app allows users to receive and confirm their incoming QSLs using a mobile device. This revolutionary method provides the user the convenience of a user-friendly mobile app while assuring the best QSO/QSL confirmation security mechanism available. This confidence could be achieved by gathering certain information from the mobile device, like GPS coordinates and/or carrier network information, in order to authenticate the user exact position. Once the account credentials and global position are verified, the system will provide the received QSL ID code in order to confirm. The system will allow the user to get the confirmation ID, necessary to confirm, preferably within a radius of 25 miles from the account settle position.

The confirmation method of the present invention provides a novel and different confirmation mechanism to the QSO/QSL exchange method already established by the eBabel printing method patented in co-owned U.S. Pat. No. 9,152,900, incorporated herein by reference in its entirety. The method of the present invention is an additional and parallel mechanism that eliminates the printing steps of the QSLs in order to get the confirmation ID. The sole purpose of sending the QSLs to a printer is to avoid the document manipulation on a computer and to trace the final destination by using third-party printing systems. This new mobile implementation provides the same functionality by only displaying the preview of the QSL card on the mobile device and marking the final destination using the GPS of the mobile device ensuring the authenticity of the QSO-QSL exchange.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

The invention claimed is:

1. A method of confirming a QSL communication between two ham Radio Stations, the method comprising:
    receiving at a central server a user's current location provided by a user's portable device, said user being associated with a ham Radio Station;
    authenticating at the central server a user's location by comparing the received current location to a user's ham Radio Station location previously registered on said central server;
    generating at the central server a unique confirmation code associated with a QSL communication between the user's ham Radio Station and another ham Radio Station when the user's location is authenticated;
    sending from said central server to said user's portable device the unique confirmation code;
    receiving at the central server a final QSL communication confirmation from the user's portable device, wherein said final QSL communication confirmation is based on said unique confirmation code and a personal identification number previously registered by the user on said central server.

2. The method of claim 1, wherein said user's current location is provided by a GPS module of said portable device.

3. The method of claim 1, wherein said user's location is authenticated when the received user's current location is within a predefined distance of the user's ham Radio Station location previously registered on said central server.

4. The method of claim 3, wherein said predefined distance comprises a 25 miles radius.

5. The method of claim 1, further comprising: updating on the central server a status of said QSL communication as confirmed by said user.

6. The method of claim 1, wherein said user is authenticated by the central server prior to said user's current location being received at said central server.

7. The method of claim 1, wherein no unique confirmation code is generated when the user's location is not authenticated.

8. A method of confirming a QSL communication between two ham Radio Stations, the method comprising:
    sending from a user's portable device to a central server a user's current location, said user being associated with a ham Radio Station;
    receiving at the user's portable device a unique confirmation code associated with a QSL communication between the user's ham Radio Station and another ham Radio Station when the user's current location is authenticated at the central server;
    sending to said central server a final QSL communication confirmation based on said unique confirmation code and a personal identification number previously registered by the user on said central server.

9. The method of claim 8, wherein said user's current location is provided by a GPS module of said portable device.

10. The method of claim 8, wherein the user's current location is authenticated when a user's current location is within a predefined distance of a user's ham Radio Station location previously registered on said central server.

11. The method of claim 10, wherein said predefined distance comprises a 25 miles radius.

12. The method of claim 8, wherein said received unique confirmation code and information related to said QSL communication are displayed to the user via a graphical user interface (GUI) on said portable device.

13. The method of claim 8, wherein said final QSL communication confirmation is provided by the user confirming said unique confirmation code and entering said personal identification number via a graphical user interface (GUI) on said portable device.

14. The method of claim 8, wherein no unique confirmation code is received when the user's location is not authenticated.

15. The method of claim 14, wherein information related to said QSL communication excluding said unique confirmation code is displayed to the user via a graphical user interface (GUI) on said portable device when the user's location is not authenticated.

* * * * *